United States Patent [19]

Jelloul

[11] Patent Number: 5,237,336
[45] Date of Patent: Aug. 17, 1993

[54] OMNIDIRECTIONAL ANTENNA SYSTEM FOR RADIO DIRECTION FINDING

[75] Inventor: Mostafa Jelloul, Verrieres Le Buisson, France

[73] Assignee: Societe Technique D'Application Et De Recherche Electronique, Massy, France

[21] Appl. No.: 692,179

[22] Filed: Apr. 26, 1991

[30] Foreign Application Priority Data

Apr. 27, 1990 [FR] France ............................ 90 05386

[51] Int. Cl.$^5$ ............... H01Q 21/140; H01Q 19/100; H01Q 19/240; G01S 3/020
[52] U.S. Cl. .................................. 343/799; 343/814; 343/815; 343/835
[58] Field of Search ............... 343/812, 814, 815, 799, 343/816, 817, 835, 836, 844, 846, 853, 810; 342/373

[56] References Cited

U.S. PATENT DOCUMENTS

| | | | |
|---|---|---|---|
| 2,581,444 | 1/1952 | Richardson et al. | 343/799 |
| 2,720,648 | 10/1955 | Chambers | 343/113 |
| 2,953,782 | 9/1960 | Byatt | 343/118 |
| 4,207,572 | 6/1980 | Hipp et al. | 342/434 |
| 4,528,567 | 9/1985 | Miles et al. | 342/417 |
| 4,636,796 | 1/1987 | Imazeki | 342/443 |
| 4,814,777 | 3/1989 | Monser | 343/799 |
| 4,870,420 | 9/1989 | Apostolos | 342/442 |
| 4,983,988 | 1/1991 | Franke | 343/853 |

FOREIGN PATENT DOCUMENTS

| | | | |
|---|---|---|---|
| 0198578 | 10/1986 | European Pat. Off. | 343/895 |
| 2525486 | 12/1976 | Fed. Rep. of Germany . | |
| 2163332 | 7/1975 | France . | |
| 2154803 | 9/1985 | United Kingdom | 342/373 |

OTHER PUBLICATIONS

IEEE Transactions On Antennas and Propagation, vol. AP-31, No. 3, May 1983, pp. 451-455, IEE, New York, H. M. Elkamchouchi, "Cyindrical and Three-Dimensional Corner Reflector Antennas".

Primary Examiner—Rolf Hille
Assistant Examiner—Peter Toby Brown
Attorney, Agent, or Firm—Dressler, Goldsmith, Shore, Sutker & Milnamow, Ltd.

[57] ABSTRACT

A radio direction finding antenna system including four identical radiating elements uniformly distributed on a circle around a conductive mast and designed to determine the angle of incidence of the propagation direction of a plane electro-magnetic wave relative to a reference direction, wherein the radiating elements are associated in first and second pairs of opposite radiating elements in which the elements are inverted relative to each other, and wherein the antenna system includes a processor unit comprising firstly a first matched power halver receiving the signals provided by the first pair of radiating elements and a second matched power halver identical to the first and receiving the signals provided by the second pair of radiating elements, and secondly a 3 dB−90° type hybrid junction receiving the signals delivered by the matched power halvers and providing two output signals at a phase difference of $2\theta - \frac{1}{2}\pi$. The invention is applicable to radio location.

18 Claims, 8 Drawing Sheets

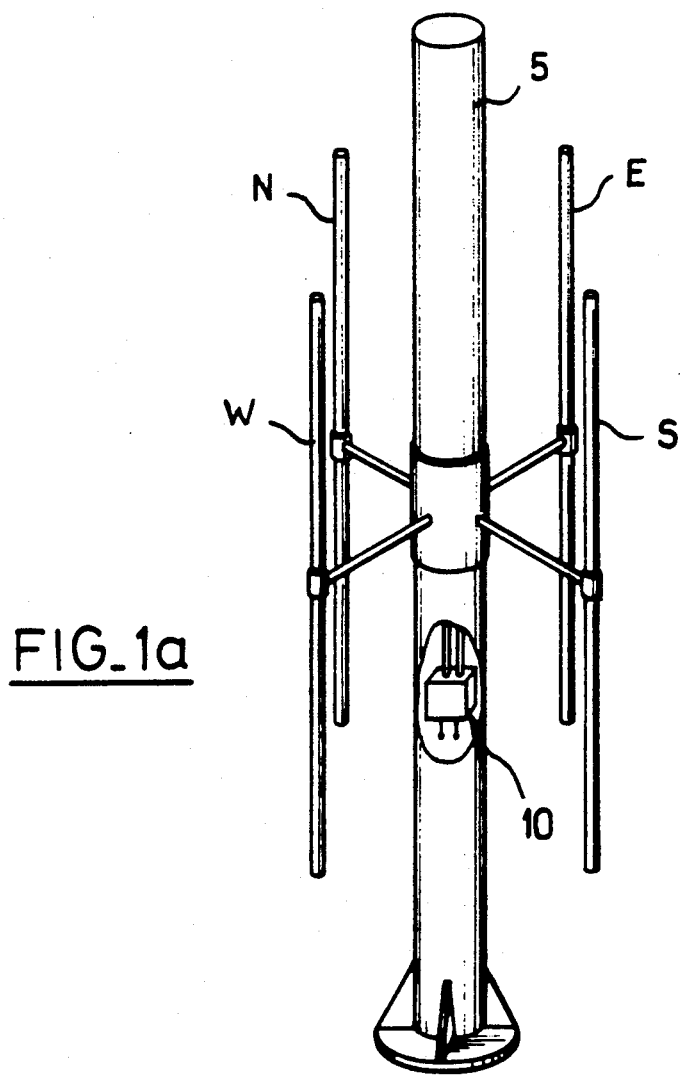
FIG_1a
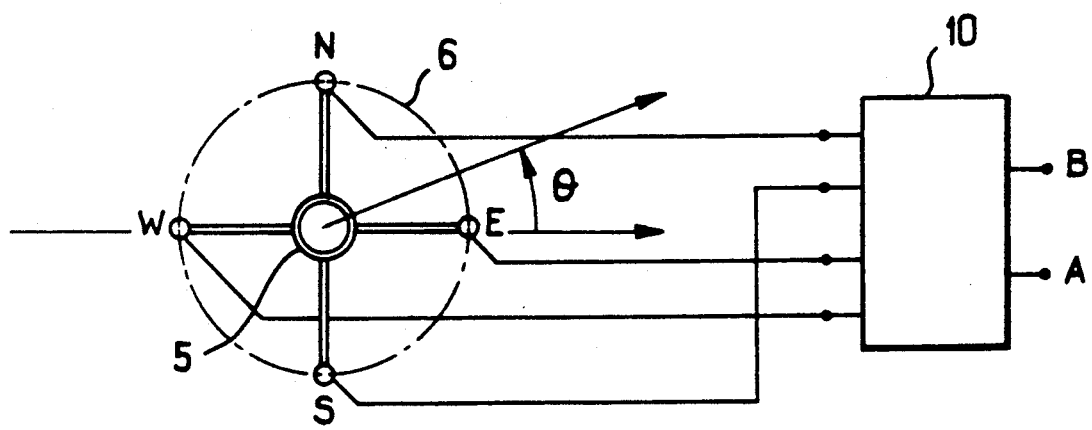
FIG_1b

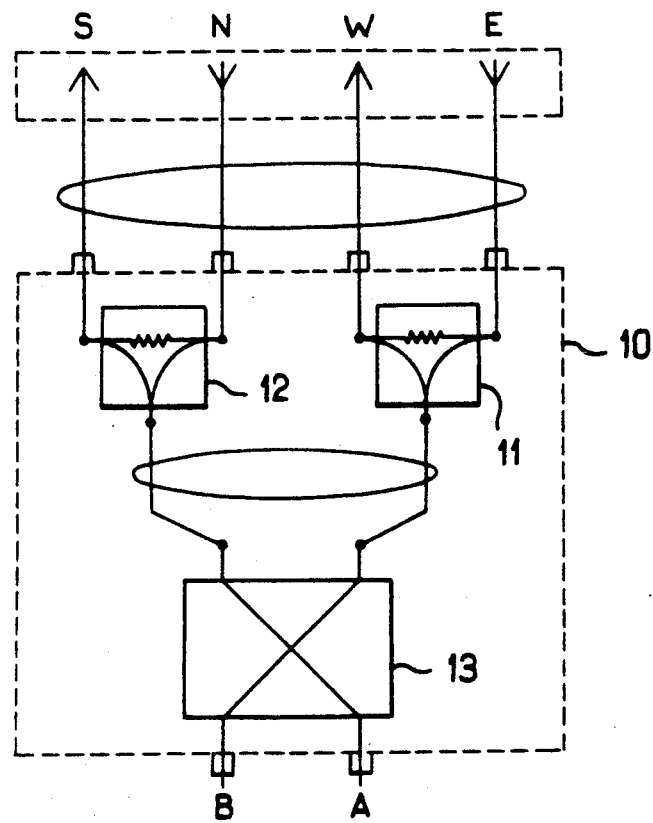
FIG_2
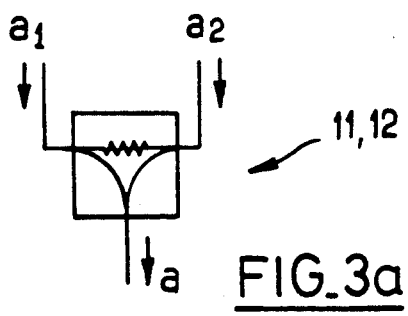
FIG_3a
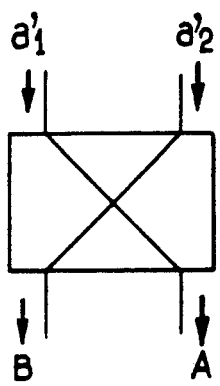
FIG_3b
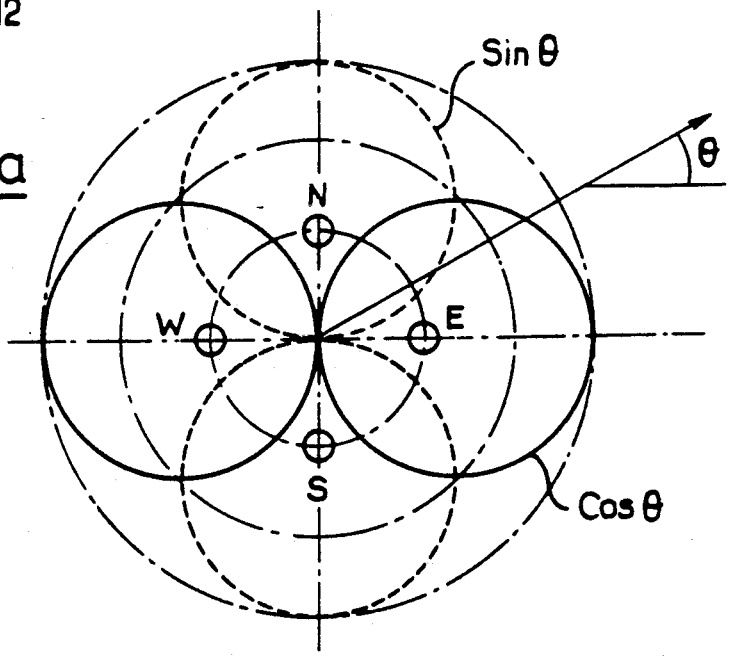
FIG_4

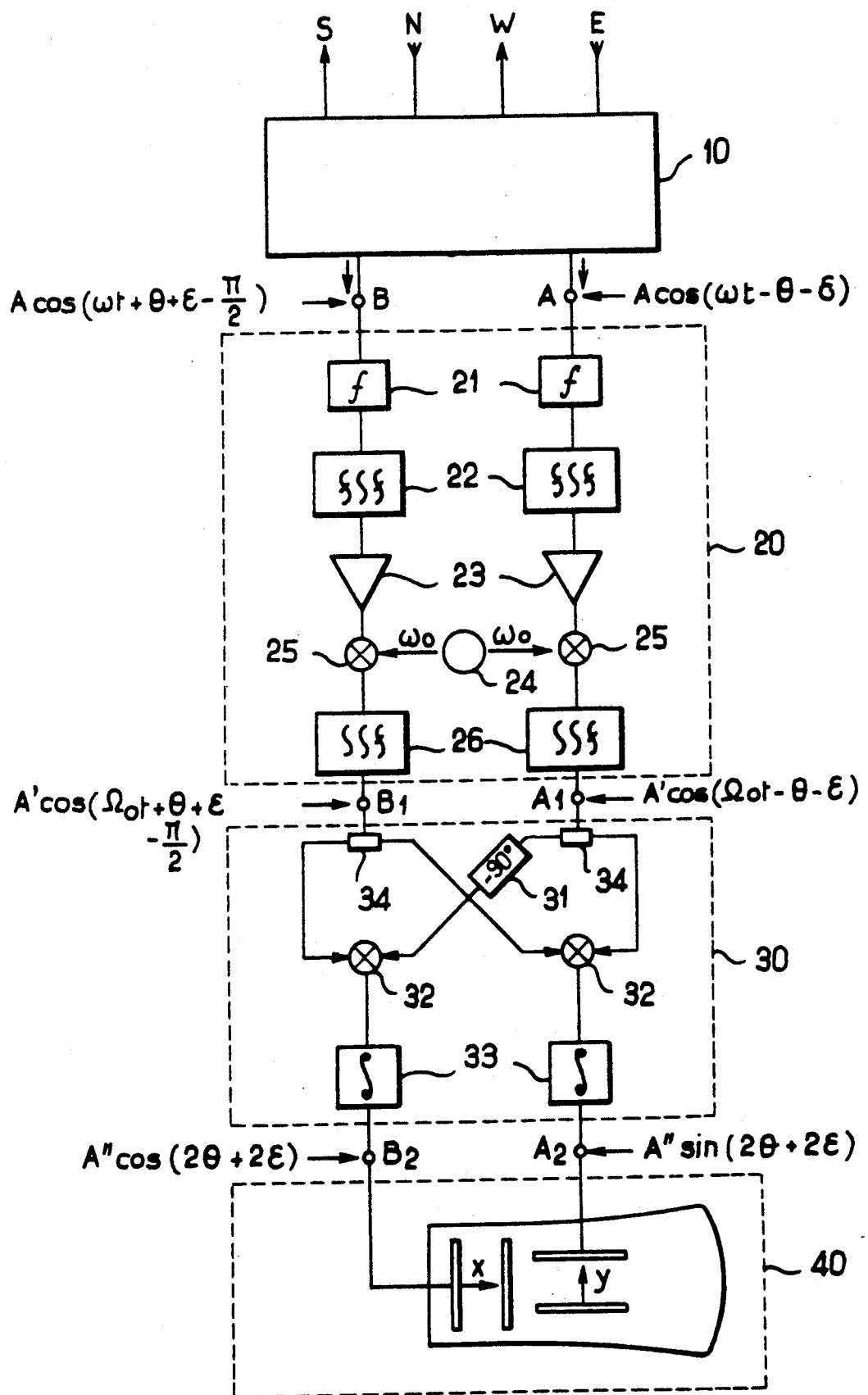
FIG_5

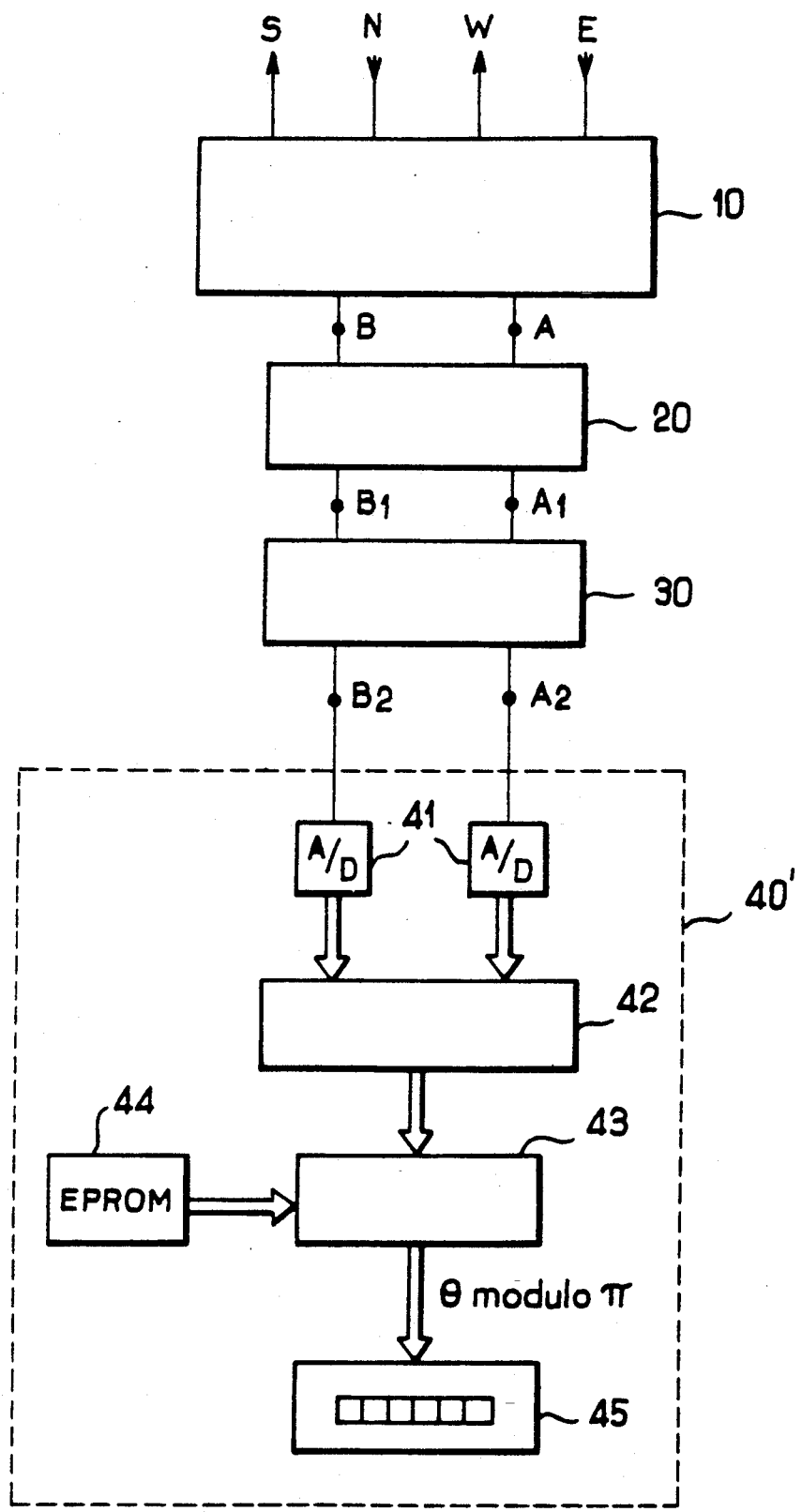
FIG_6

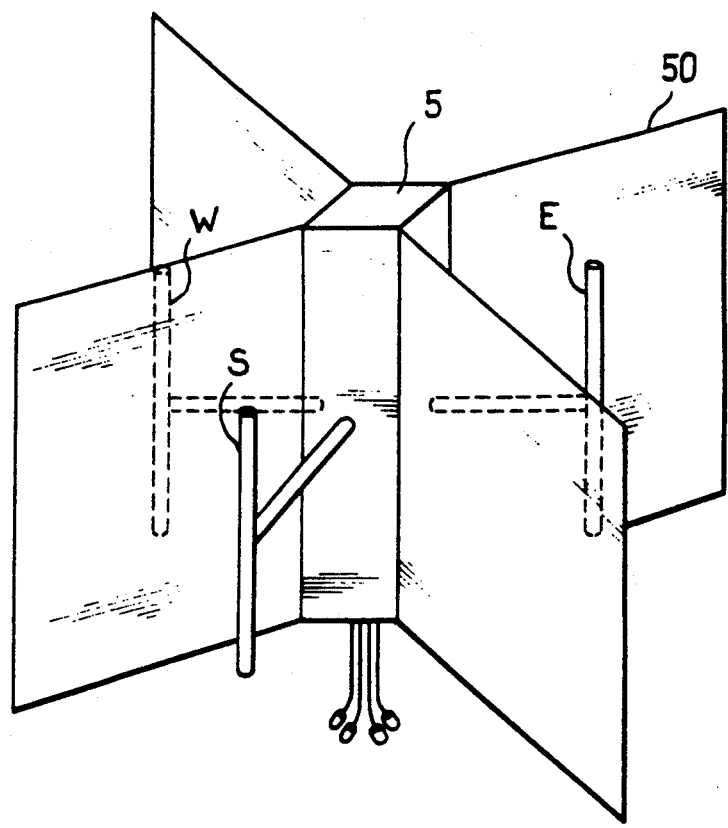
FIG_9a
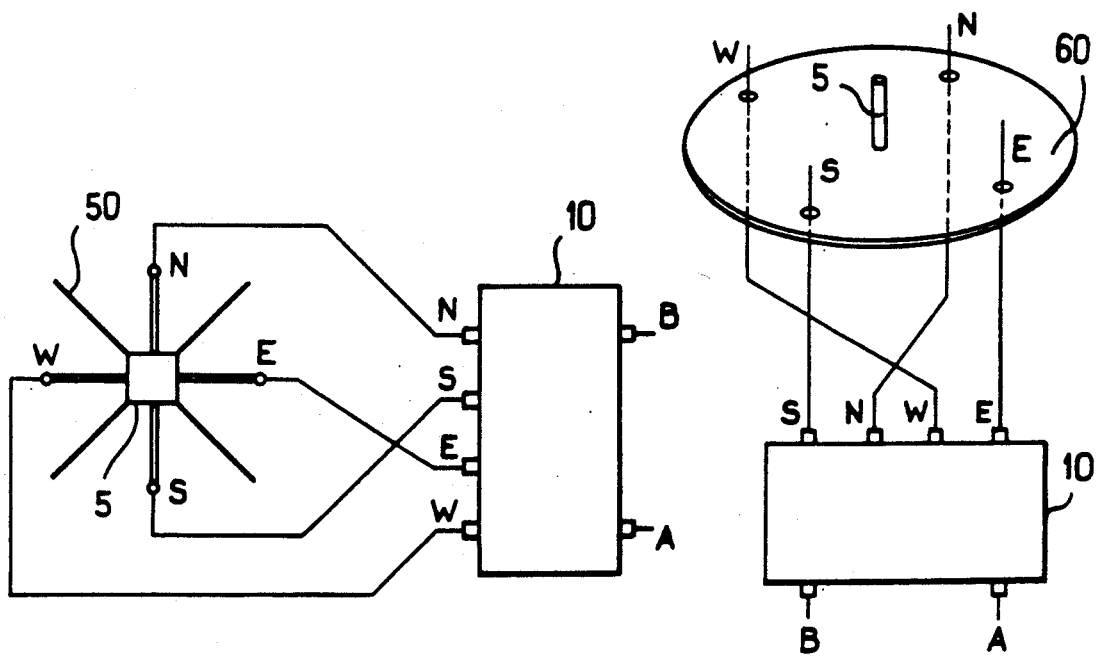
FIG_9b
FIG_10

OMNIDIRECTIONAL ANTENNA SYSTEM FOR RADIO DIRECTION FINDING

The present invention relates to an antenna system for radio direction finding (RDF), the system comprising four identical radiating elements uniformly distributed on a circle around a conductive mast, and designed to determine the angle of incidence of the propagation direction of a plane electromagnetic wave relative to a reference direction.

BACKGROUND OF THE INVENTION

The invention is advantageously applicable throughout the field of radio location in all RF bands, and in particular in the HF, VHF, and UHF bands. In general, the antenna system of the invention is applicable to detection and surveillance, and in particular to anticollision device, e.g. between aircraft, and to warning devices. It may be installed fixed on the ground or it may be carried by a land vehicle, a ship, or an aircraft.

Radio direction finding applied to radiolocation is conventionally based on two known techniques: the Watson-Watt technique with an Adcock antenna; and the Doppler effect technique.

The Watson-Watt technique uses amplitude information in that the ratio of signal amplitudes from two orthogonal pairs of dipoles provides an approximation to the tangent of the looked-for angle of incidence. This method is not very accurate because of octant error, which error is also sensitive to the elevation angle of the incident wave.

The Doppler effect technique which requires a large number of radiating elements (e.g. 16 or 32 or even more) has low sensitivity because of the coupling between the radiating elements and above all it requires the radiating elements to be switched cyclically and at high speed. In addition, the relatively complex acquisition and processing electronics must be accurate and stable over time. Further, this technique requires in particular an auxiliary reference antenna for eliminating the phase modulation that is often present in the signals to be located.

Other techniques exist based on the known principle of interferometry. However all such techniques require a plurality of antennas to be switched.

Thus, the technical problem to be solved by the present invention is to provide an antenna system in accordance with the preamble that does not include a switching device, that provides good sensitivity and good locating accuracy, and that is compact.

SUMMARY OF THE INVENTION

The present invention solves the technical question as posed in that said radiating elements are associated in first and second pairs of opposite radiating elements in which the antenna system includes a processor unit comprising firstly a first matched power halver receiving the signals provided by the first pair of radiating elements and a second matched power halver identical to the first and receiving the signals provided by the second pair of radiating elements, and secondly a 3 dB−90° type hybrid junction receiving the signals delivered by said matched power halvers and providing two output signals at a phase difference of $2\theta - \frac{1}{2}\pi$ (modulo a constant).

As explained in detailed below, the antenna receiver is based on the following operating principle. If the looked-for angle of incidence relative to a reference direction, e.g. the line interconnecting two of the radiating elements in the same pair, is written $\theta$, then the signals delivered by the two matched power halvers are proportional to sin $\theta$ and to cos $\theta$, respectively. These two signals which are at the same frequency, are then processed by the 3 dB−90° hybrid junction to provide two new signals, having the same amplitude and the same frequency, but with one of then being phased shifted by $\theta$ while the other is phase shifted by $-\theta$ (modulo a constant) relative to a common arbitrary reference phase. Consequently, the phase difference between the two signals varies linearly with $\theta$ and is substantially equal to $2\theta$. A value of 1° in the angle $\theta$ therefore gives rise to a difference of 2° in the phase difference. Conversely, an uncertainty of 1° in measuring the phase difference between the two signals, for example, gives rise to uncertainty of 0.5° on the measured propagation direction.

As can be seen, the RDF antenna system of the invention operates in real time, thereby enabling short duration signals to be located, providing the receiver system is adapted to such pulses. This advantage is due to the fact that no radiating element switching and no reception path switching is required to extract the desired angle information. Another advantage of the system of the invention is to make it possible to locate an electromagnetic wave that is modulated in amplitude and/or phase without requiring an auxiliary antenna. This advantage comes from the fact that at all times the system of the invention presents two signals having the same amplitude and in which the phase difference is independent of any phase modulation of the incident wave.

Further, the antenna system of the invention is simple and robust, this being related to the small number of mechanical parts and the small number of electronic components (halvers, hybrid junction) required for manufacturing it. Its robustness stems from having no active components (e.g. switches) and from the fact that no moving mechanical parts are used.

It should also be observed that an airborne system in accordance with the invention gives good locating accuracy (except for the effect of inteference due to the environment), even though it is small in size compared with the wavelength. This advantage typically gives rise to uncertainty in location that is equal to one-half the instrumental uncertainty.

Finally, another advantage of the antenna system of the invention is that its sensitivity is equivalent to that which would be obtained using a single radiating element for reception, i.e. an element of the same type as those constituting the circular array itself. This advantage comes from the fact that the radiation pattern is omnidirectional and the gain of the antenna is of the same order as or is greater than the gain of an isolated single radiating element.

When used in a low frequency band, it is advantageous to deploy a plurality of systems of the invention so as to make it possible by appropriate processing to eliminate interferring waves due to multi-path propagation.

BRIEF DESCRIPTION OF THE DRAWINGS

Embodiments of the invention are described by way of example with reference to the accompanying drawings, in which:

FIG. 1a is a perspective view of an RDF antenna system of the invention implementing symmetrical dipoles as the radiating elements.

FIG. 1b is a diagrammatic plan view of the antenna system shown in FIG. 1a.

FIG. 2 is a circuit diagram of a processor unit for the antenna system of the invention.

FIG. 3a shows a matched power halver used in the processor unit of FIG. 2.

FIG. 3b shows a hybrid junction used in the processor unit of FIG. 2.

FIG. 4 is a horizontal radiation pattern showing how the processor unit of FIG. 2 operates.

FIG. 5 is a first circuit diagram of an embodiment of an antenna system of the invention.

FIG. 6 is a second circuit diagram of an embodiment of an antenna system of the invention.

FIGS. 9a and 9b are respectively a perspective view and a plan view of an antenna system of the invention implementing symmetrical dipoles and V-shaped reflectors.

FIG. 10 is a perspective view of an antenna system of the invention suitable for implementing unipoles on a reflecting surface.

DETAILED DESCRIPTION

Figure 7:
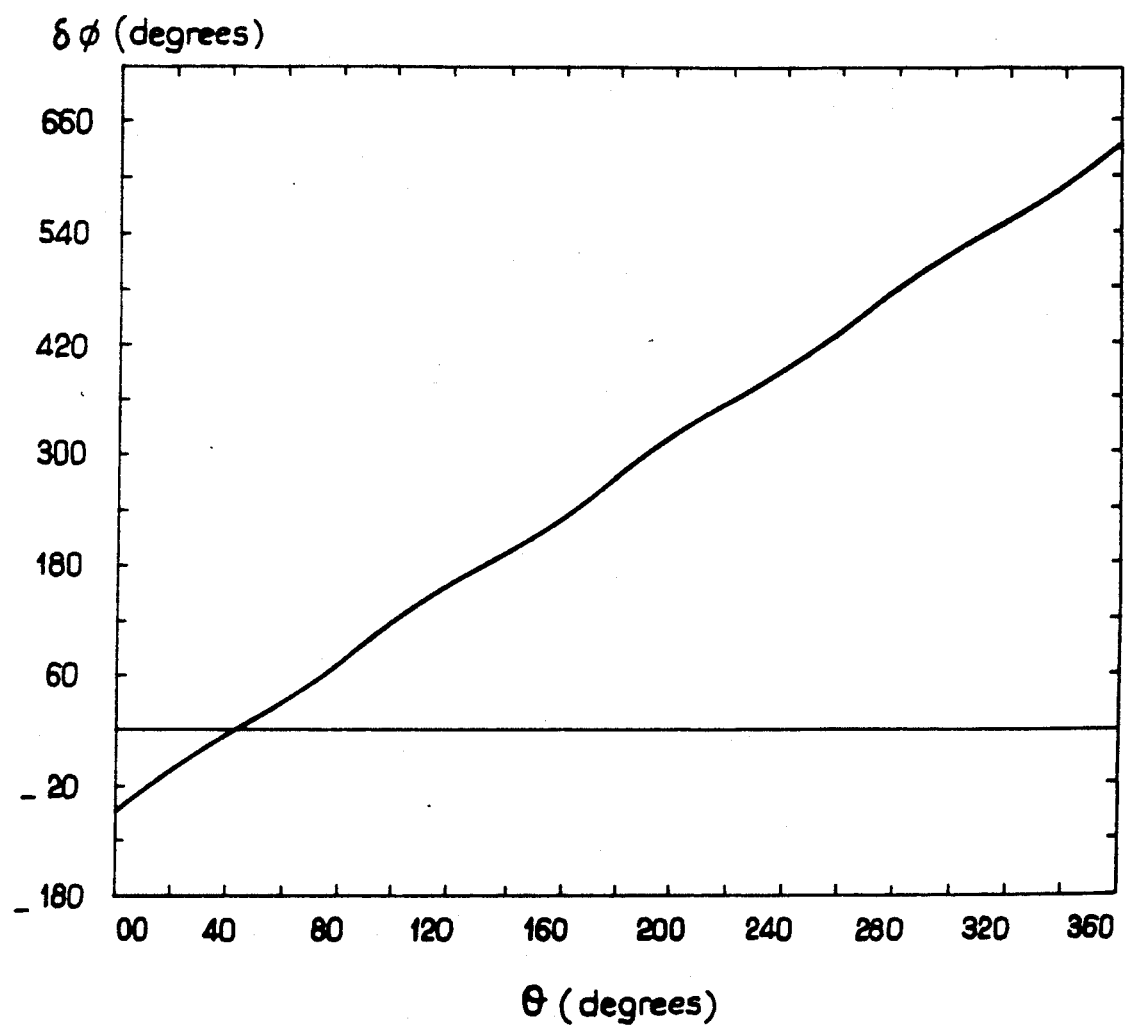
FIG. 7 is a radio direction finding curve obtained using the antenna system of the invention.

The radio direction finding antenna system shown in FIG. 1a includes radiating elements constituted by four identical symmetrical dipoles referenced E, N, W, S, and uniformly distributed on a circle 6 around a central conductive mast 5, (as can be seen in FIG. 1b).

The diameter of the metal mast 5 has no significant effect on antenna performance. Thus, it can be as large (round or square) as required depending on mechanical constraints. For example, in VHF and UHF bands, its diameter may be about 150 mm, i.e. 0.05 λ to 0.2 λ, where λ is the wavelength.

The total height of the mast 5 which carries the array of four dipoles halfway up must be greater than the length of the radiating elements. This length is typically 0.7 λ or more, i.e. 2.10 meters (m) at 100 MHz, for example.

The diameter of the circular array is not an essential parameter in the design of the antenna. It must be less than the wavelength to operate with the direction finding principle used. This diameter is advantageously less than 0.75 λ and preferably lies in the range 0.2 λ to 0.6 λ. It is selected as a function of the radiating elements and of the working frequency band.

The radiating elements such as conventional symmetrical half-wave dipoles or "folded" dipoles, quarter-wave unipoles on reflecting surfaces, or dipoles or unipoles between pairs of reflectors or within corner reflectors are merely non-limiting examples of suitable radiating elements. Which particular radiating elements are selected depends on the frequency band, the bandwidth, and on the operating environment of the antenna system of the invention. However, the dimensions and indeed the type of radiating element are constrained by the following conditions:

the radiating elements are not very directional in azimuth;

the radiating elements are preferably vertically polarized; and their dimensions must be compatible with all four radiating elements being disposed in a circular array.

The antenna system of FIGS. 1a and 1b is designed to determine the angle of incidence $\theta$ (see FIG. 1b) of the propagation direction of a plane electromagnetic wave relative to a reference direction, e.g. the W-E axis.

For operation to comply with the direction finding principle used, the two dipoles in each pair should be inverted relative to each other. This inversion may be obtained mechanically or electrically, and has the effect of establishing a 180° phase shift between the currents flowing in each of the two dipoles of the same pair.

As shown in FIGS. 1a and 1b, the antenna system of the invention includes a signal processor unit 10 for processing the signals delivered by the four dipoles E, N, W, S. This processor unit associated with the antenna may be constituted by a circuit enclosed in a small metal housing having connectors and disposed either at the same height as the radiating elements and inside the mast 5, or else at the base of the mast. In any event, regardless of the position in which the processor unit 10 is located, the cables connecting each dipole to said processor unit must all be identical in length.

As shown in FIG. 2, the processor unit 10 comprises a first matched power halver 11 (i.e. a power divider for dividing by two) receiving the signals provided by the first pair of dipoles E-W, and a second matched power halver identical to the first and receiving the signals provided by the second pair of dipoles N-S. The two power halvers are connected to a hybrid junction 13 by respective lines that are of equal electrical length.

The term "matched power halver" comes from the fact that when this type of circuit is used for transmission, it provides accurately balanced powers to two identical output loads, and in addition these two outputs are electrically decoupled from each other such that, when used in reception, the circuit constitutes a signal summing circuit.

The matched power halver 11, 12 shown in FIG. 3a operates as follows: if a1 and a2 are the input signals, then using conventional complex notation, the output signal can be written as follows:

$a = (a1/\sqrt{2} + a2/\sqrt{2})e^{-j\phi 0}$ where $\phi 0$ is an arbitrary phase determined by the hardware of the halver.

The 3 dB−90° hybrid junction shown in FIG. 3b, also referred to as a "3 dB coupler", provides two output signals in response to two input signals a'1 and a'2, namely:

on output A: $(a'2/\sqrt{2} - j\, a'1/\sqrt{2})e^{-j\phi 1}$ and on output B: $(a'1/\sqrt{2} - j\, a'2/\sqrt{2})e^{-j\phi 1}$ where $\phi 1$ is some other arbitrary phase fixed by the hardware of the 3 dB coupler.

Insofar as they have the same effect on all of the signals, the arbitrary phases $\phi 0$ and $\phi 1$ have no effect on the final result. Thus, for the purpose of simplifying the equations, these phases are taken below as being equal to zero.

The signal leaving the first power halver 11 of FIG. 2 and constituted by a combination of the signals provided by the first dipole pair E-W is proportional to cos $\theta$, whereas the second power halver 12 delivers an output signal proportional to sin $\theta$ by combining the signals delivered by the second dipole pair N-S. These two signals proportional to sin $\theta$ and to cos $\theta$ also have the same frequency. The pattern of FIG. 4 shows the directional responses in the horizontal plane of each dipole pair to a plane electromagnetic wave having an angle of incidence $\theta$. The dashed line circles correspond to the signal in sin $\theta$ from the pair N-S and the solid line circles are associated with the signal in cos $\theta$ provided by the pair E-W.

Returning to FIG. 2, the hybrid junction 13 delivers two output signals, with the signal at A being proportional to:

$$\cos \theta - j \sin \theta = e^{-j\theta}$$

and with the signal at B being proportional to:

$$\sin \theta - j \cos\theta = e^{-j(\theta - \frac{1}{2}\pi)}$$

These two signals therefore have the same amplitude and they are represented in FIG. 4 by the same dot-dashed line circle of radius 1.

The phase difference $\delta\phi$ between the phases $\phi B$ and $\phi A$ of the two signals from the hybrid junction is thus given by:

$$\delta\phi = \phi B - \phi A = 2\theta - \frac{1}{2}\pi$$

The antenna system of the invention thus provides a way of obtaining two signals having a phase difference which is a linear function of the looked-for angle of incidence $\theta$. In addition, as shown in FIG. 4, the system is totally omnidirectional.

By way of example, FIG. 7 gives the RDF curve for $\delta\phi$ as a function of $\theta$. This curve is a straight line of gradient 2, with regular small-amplitude undulations superposed thereon corresponding to a non-linear phase error $\epsilon$, with the exact phase difference being given by:

$$\delta\phi = 2(\theta + \epsilon) - \frac{1}{2}\pi$$

This phase non-linearity error $\epsilon$ is a periodic function of $\theta$ having a period of 90° and an amplitude of about 4° in the example shown. The smaller the diameter of the dipole array, the smaller the error. However, this error is never unacceptable since, as explained below, it is taken into account when calibrating the radio direction finding processor.

Figure 8:
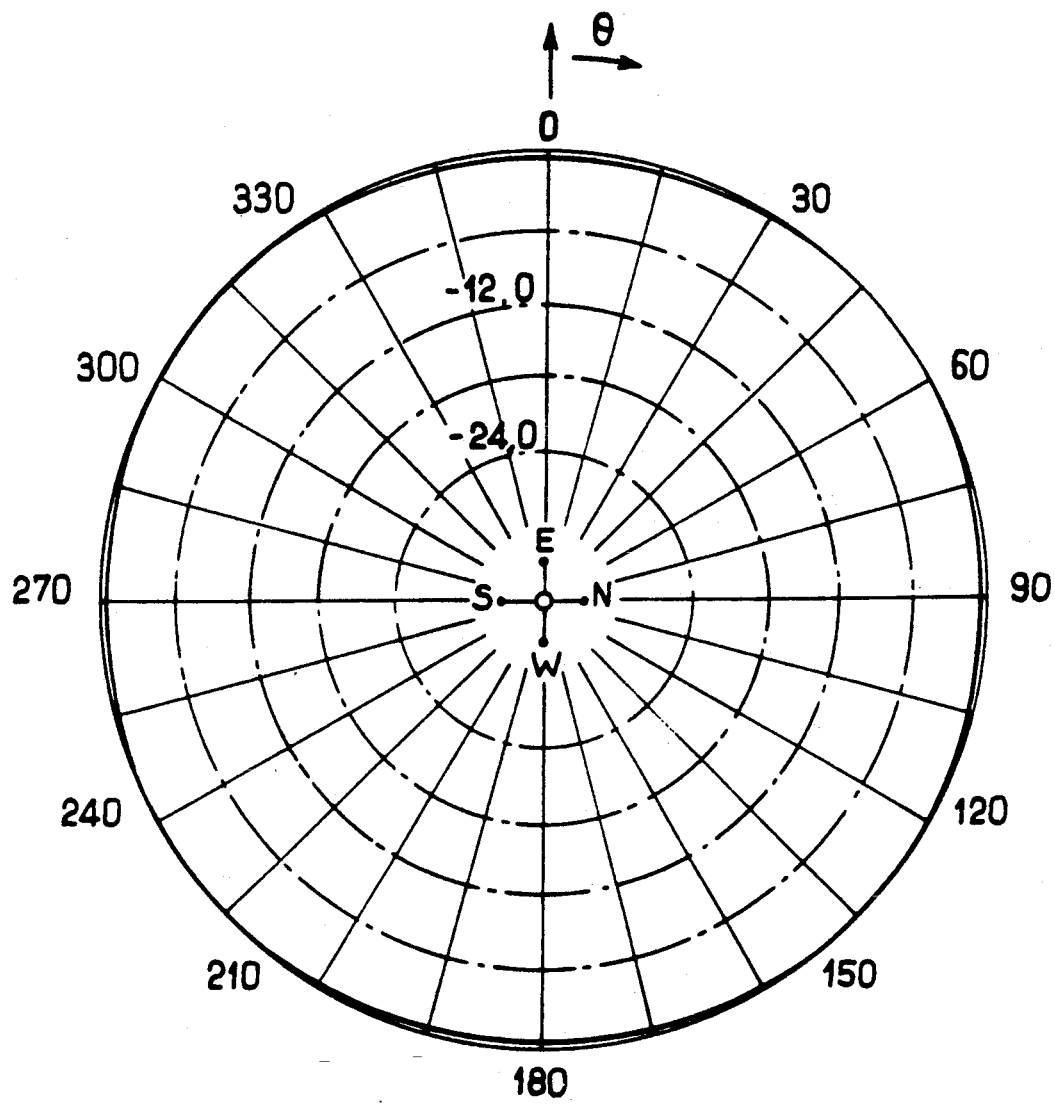
FIG. 8 is a horizontal radiating pattern of an antenna system of the invention.

FIG. 8 shows the horizontal radiation pattern at elevation angle 0 for each of the outputs A and B of the processor unit 10. This pattern is omnidirectional to within ±0.3 dB, and it is identical for both outputs A and B. It was obtained using an antenna operating in the VHF band and having a diameter of about 0.28 $\lambda$, with four half-wave dipoles around a mast having a diameter of 0.15 m. The result shown in FIG. 7 corresponds to a configuration having these dimensions.

It should also be observed that the antenna system of the invention is not sensitive to horizontal polarization in the incident wave, but that if it did have high sensitivity thereto, then the straight line of the direction finding curve would be deformed. If the antenna is carefully designed, its polarization discrimination is better than 25 dB.

In addition, locating accuracy in azimuth is not very sensitive to the elevation angle of the incident wave. Good accuracy is conserved up to very high angles of elevation and it is limited merely by the loss of sensitivity due to the received signal being attenuated at high angles of elevation, with such attenuation varying with the square of the sine of the angle of elevation.

Finally, since the phase difference $\delta\phi$ between the two outputs A and B is independent of the modulation on the incident wave, there is no need to take a reference signal from some other antenna in order to eliminate the modulation.

In practice, the components of the processor unit 10 may be based on ferrite materials in the Hf, VHF, and even UHF bands for reasons of compactness, or they may be based on micro-strip technology in the higher frequency bands.

The embodiment of FIG. 5 shown downstream from the processor unit 10, a receiver circuit 20 for receiving the same-amplitude signals delivered at the terminals A and B of the processor unit 10. Each of these reception paths includes a limiter 21, a bandpass filter 22, a signal amplifier 23, a mixer 25 coupled to a local oscillator 24 for reducing the frequency of the signals from w to $\Omega 0 = w - w0$, and a lowpass filter 26 for eliminating the $w + w0$ spectrum line.

The two output signals from the receiver circuit 20 at terminals A1 and B1 are then processed by a sine-cosine resolver 30 which uses two dividers 34, a phase shifter 31 and two identical coherent detectors 32 followed by two integrators 33 to provide two DC signals at A2 and B2, one of which is proportional to the sine of the phase difference angle between the signals delivered by the antenna.

The two output signals from the resolver 30 are applied to the plates of a cathode ray tube (CRT) 40 to display the angle of incidence $\theta$ (modulo$\pi$) directly in real time (assuming the entire system has been calibrated).

The second embodiment shown in FIG. 6 relies on the signals from the resolver 30 being digitally processed by an RDF processor 40 which includes two analog-to-digital converters 41 that apply the signals digitized in this way to a computer 42 for determining their phase difference. The value of this phase difference is compared by a digital comparator 43 with the calibrated RDF curve of the complete system as previously stored in a non-volatile memory 44. This comparison provides the exact angle $\theta$ (modulo $\pi$) whose value is displayed on a display 45. The term "display" designates any device for displaying the magnitude $\theta$, including a graphics unit.

FIGS. 9a and 9b show radiating elements constituted by symmetrical dipoles E, N, W, S separated by reflectors 50 constituting rectangular V-shapes. This type of antenna is preferably used in ground applications in the UHF band. The length of the arm connecting each dipole to the mast 5 lies in the range 0.2 $\lambda$ to 0.3 $\lambda$. To ensure omnidirectional behavior, the separators 50 should not be too long: their length is typically chosen to lie in the range 0.4 $\lambda$ to 0.5 $\lambda$. The height of the separators 50 must be greater than that of the dipoles, i.e. 0.6 $\lambda$ to 0.7 $\lambda$.

The antenna of FIG. 10 comprises radiating elements constituted by quarter-wave unipoles disposed on a reflecting surface 60 in a circle around a central mast 5, and as for the dipoles, the diameter of the circle lies in the range 0.2 $\lambda$ to 0.6 $\lambda$. This antenna is mainly intended to be installed on board an aircraft. Its typical working frequency lies in the L band.

Figure 11A:
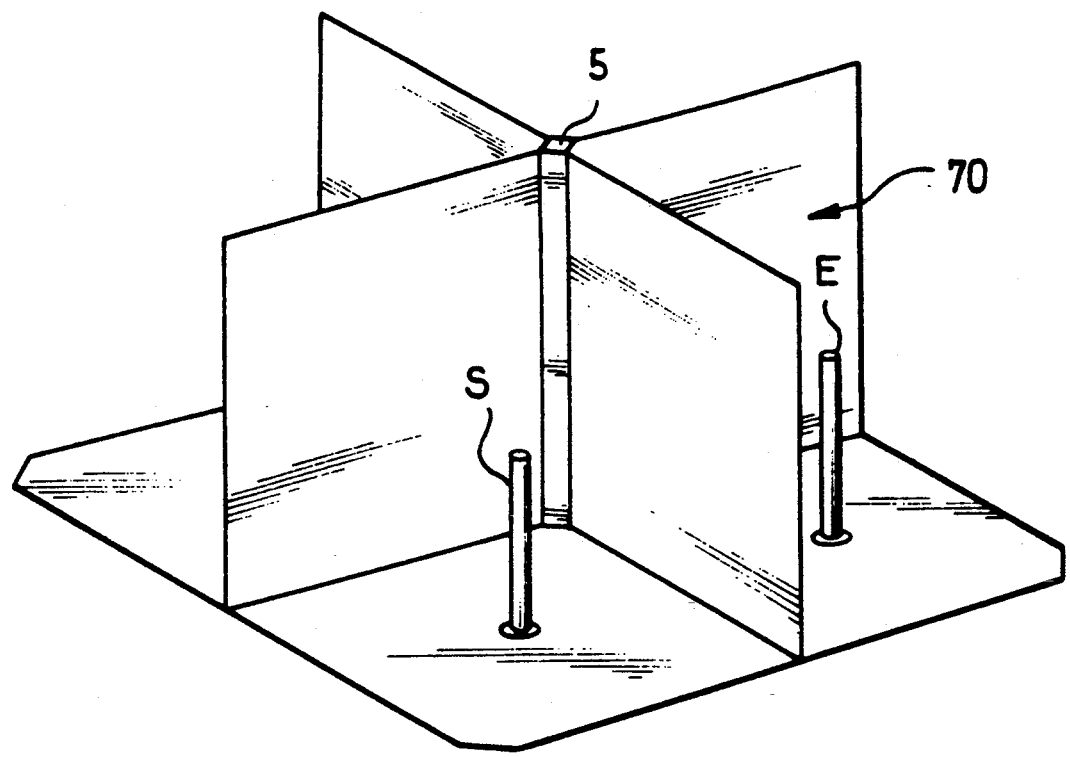
FIGS. 11a and 11b are perspective views of an antenna system of the invention implementing unipoles with corner reflectors.
Figure 11B:
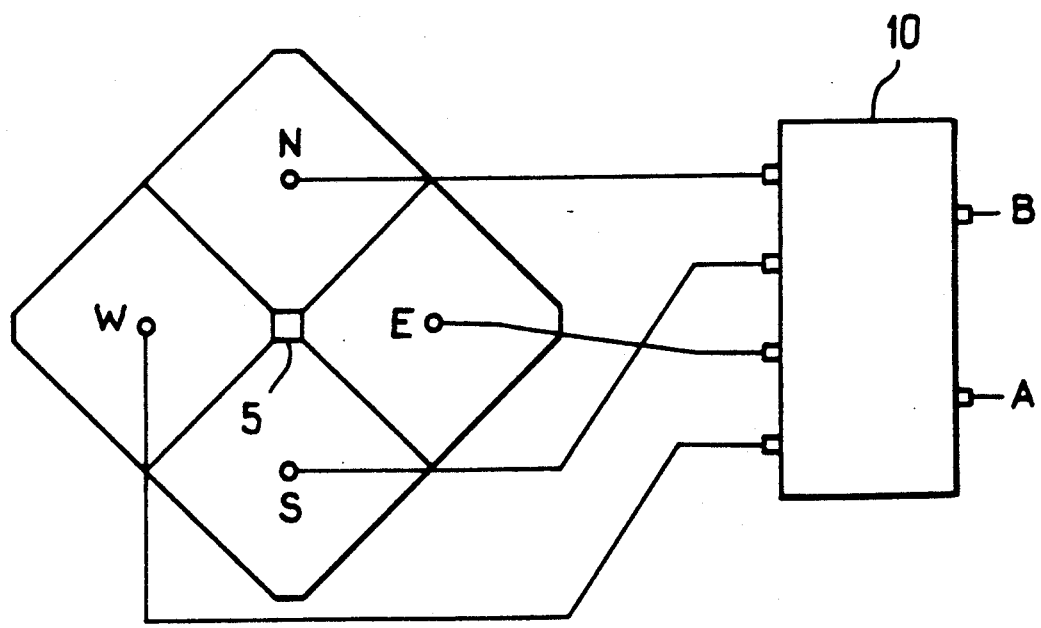

Finally, FIGS. 11a and 11b show an antenna of the invention constituted by four unipoles placed inside rectangular corner reflectors 70. Each of the faces of these corner reflectors are identical squares of side about 0.4 $\lambda$. This type of antenna is used in applications on the ground or on a vehicle, in the UHF and VHF bands.

Naturally, the antenna system described may operate in entirely equivalent manner in transmission for the purpose of producing electromagnetic waves having amplitude and phase properties equivalent to its operation in reception for a given direction $\theta$.

I claim:

1. A radio direction finding antenna system including four identical radiating elements uniformly distributed on a circle around a conductive mast and designed to determine the angle $\theta$ of incidence of the propagation direction of a plane electromagnetic wave relative to a reference direction, wherein said radiating elements are associated in first and second pairs of diametrically opposite radiating elements, the total height of the mast being greater than the length of the radiating elements, the elements of each pair being mechanically inverted relative to each other so as to establish a 180° phase shift between the currents flowing in each of the two elements of the same pair, and wherein said antenna system includes a processor unit comprising a first two-way in-phase divider having two inputs for receiving the signals provided by the first pair of radiating elements and a second two-way in-phase power divider identical to the first and having two inputs for receiving the signals provided by the second pair of radiating elements, said power dividers each having an output, said processor unit comprising a 3 dB−90° type hybrid junction receiving the signals delivered by said power divider outputs and providing two output signals at the same amplitude and a phase difference of $2\theta-(\frac{1}{2})\pi$ plus a constant, and wherein said antenna system includes calculation means for computing the angle $\theta$ of incidence on the basis only of the phases of the two output signals of the 3 dB−90° type hybrid junction.

2. An antenna system according to claim 1, wherein after said processor unit, the system includes a receiver circuit for lowering the frequency of each of the two signals delivered by the hybrid junction, a resolver responsive to the two signals from the receiver circuit to provide two DC signals respectively proportional to the cosine and to the sine of said phase difference, and a radio direction finding processor.

3. An antenna system according to claim 2, wherein said radio direction finding processor is constituted by a cathode ray tube suitable, after prior calibration, for displaying the looked-for angle.

4. An antenna system according to claim 2, wherein said radio direction finding processor includes a computer delivering a value for said phase difference, a comparator for comparing said value to a calibrated radio direction finding curve stored in non-volatile memory, and a display for displaying the value of the looked-for angle of incidence.

5. An antenna system according to claim 1, wherein the diameter of the circle is less than 0.75 $\lambda$, where $\lambda$ is the wavelength of said plane electromagnetic wave.

6. An antenna system according to claim 1, wherein said radiating elements are symmetrical dipoles.

7. An antenna system according to claim 6, wherein said dipoles are separated by reflectors constituting rectangular V-shapes.

8. A radio direction finding antenna system including four identical radiating dipoles uniformly distributed on a circle around a conductive mast and designed to determine the angle $\theta$ of incidence of the propagation direction of a plane electromagnetic wave relative to a reference direction, wherein said radiating dipoles are made of two symmetrical radiating parts and are associated in first and second pairs of diametrically opposite radiating dipoles, the total height of the mast being greater than the length of the radiating elements, each part of a dipole being connected to a conductive wire of a feed line comprising two conductive wires, the dipoles of each pair being inverted relative to each other so as to establish a 180° phase shift between the currents flowing in each of the two dipoles of the same pair, by way of inversion of the wires of the feed lines relative to the parts of the radiating dipoles, and wherein said antenna system includes a processor unit comprising a first two-way in-phase power divider having two inputs for receiving the signals provided by the feed lines connected to the first pair of radiating dipoles and a second two-way in-phase power divider identical to the first and having two inputs for receiving the signals provided by the feed lines connected to the second pair of radiating dipoles, each one of said power dividers having an output, said processor unit comprising a 3 dB−90° type hybrid junction receiving the signals delivered by said power divider outputs and providing two output signals at the same amplitude and a phase difference of $2\theta-(\frac{1}{2})\pi$ plus a constant, and wherein said antenna system includes calculation means for computing the angle $\theta$ of incidence on the basis only of the phases of the two output signals of the 3 dB−90° type hybrid junction.

9. A radio direction finding antenna system including four identical radiating dipoles uniformly distributed on a circle around a conductive mast and designed to determine the angle $\theta$ of incidence of the propagation direction of a plane electromagnetic wave relative to a reference direction, wherein said radiating dipoles are made of two symmetrical radiating parts and are associated in first and second pairs of diametrically opposite radiating dipoles, the total height of the mast being greater than the length of the radiating elements, each part of a dipole being connected to a conductive wire of a feed line comprising two conductive wires, the dipoles of each pair being inverted relative to each other so as to establish a 180° phase shift between the currents flowing in each of the two dipoles of the same pair, by way of inversion of the wires of the feed lines relative to the parts of the radiating dipoles, and wherein said antenna system includes a processor unit comprising a first two-way in-phase power divider having two inputs for receiving the signals provided by the feed lines connected to the first pair of radiating dipoles and a second two-way in-phase power divider identical to the first and having two inputs for receiving the signals provided by the feed lines connected to the second pair of radiating dipoles, each one of said power dividers having an output, said processor unit comprising a 3 dB−90° type hybrid junction receiving the signals delivered by said power divider outputs and providing two output signals at the same amplitude and a phase difference of $2\theta-(\frac{1}{2})\pi$ plus a constant, and wherein said antenna system includes calculation means for computing the angle $\theta$ of incidence on the basis only of the phases of the two output signals of the 3 dB−90° type hybrid junction.

10. An antenna system according to claim 9, wherein said radiating elements are unipoles on a reflecting surface.

11. An antenna system according to claim 9, wherein after said processor unit, the system includes a receiver circuit for lowering the frequency of each of the two signals delivered by the hybrid junction, a resolver responsive to the two signals from the receiver circuit to provide two DC signals respectively proportional to the cosine and to the sine of said phase difference, and a radio direction finding processor.

12. An antenna system according to claim 11, wherein said radio direction finding processor is constituted by a cathode ray tube suitable, after prior calibration, for displaying the looked-for angle.

13. An antenna system according to claim 11, wherein said radio direction finding processor includes a computer delivering a value for said phase difference, a comparator for comparing said value to a calibrated radio direction finding curve stored in non-volatile memory, and a display for displaying the value of the looked-for angle of incidence.

14. An antenna system according to claim 9, wherein the diameter of the circle is less than 0.75 $\lambda$, where $\lambda$ is the wavelength of said plane electromagnetic wave.

15. An antenna system according to claim 9, wherein said radiating elements are symmetrical dipoles.

16. An antenna system according to claim 15, wherein said dipoles are separated by reflectors constituting rectangular V-shapes.

17. An antenna system according to claim 10, wherein said unipoles are disposed inside rectangular corner reflectors.

18. An antenna system according to claim 10, wherein each unipole is disposed perpendicular to one plane of a rectangular trihedral reflector, having three planes, the intersection of two of said three planes being parallel to said unipole.

* * * * *

UNITED STATES PATENT AND TRADEMARK OFFICE
CERTIFICATE OF CORRECTION

PATENT NO. : 5,237,336
DATED : August 17, 1993
INVENTOR(S) : Mostafa Jelloul

It is certified that error appears in the above-indentified patent and that said Letters Patent is hereby corrected as shown below:

Column 1, line 57, before "antenna" insert --elements are inverted relative to each other, and in that said--.

Column 6, line 24, before "sine" insert --cosine and the other of which is proportional to the--;
    line 34, "40" should be --40'--.

Replace claim 9 with the following:

--9. A radio direction finding antenna system including four identical radiating elements uniformly distributed on a circle around a conductive mast and designed to determine the angle θ of incidence of the propagation direction of a plane electromagnetic wave relative to a reference direction, wherein said radiating elements are associated in first and second pairs of diametrically opposite radiating elements, the total height of the mast being greater than the length of the radiating elements, the elements of each pair being electrically inverted relative to each other so as to establish a 180° phase shift between the currents flowing in each of the two elements of the same pair, and wherein said antenna system includes a processor unit comprising a first two-way in-phase power divider having two inputs for receiving the signals provided by the first pair of radiating elements and a second two-way in-phase power divider identical to the first and

UNITED STATES PATENT AND TRADEMARK OFFICE
CERTIFICATE OF CORRECTION

PATENT NO. : 5,237,336
DATED : August 17, 1993
INVENTOR(S) : Mostafa Jelloul

It is certified that error appears in the above-indentified patent and that said Letters Patent is hereby corrected as shown below:

having two inputs for receiving the signals provided by the second pair of radiating elements, said power dividers each having an output, said processor unit comprising a 3dB-90° type hybrid junction receiving the signals delivered by said power divider outputs and providing two output signals at the same amplitude and a phase difference of $2\theta - (1/2)\pi$ plus a constant, and wherein said antenna system includes calculation means for computing the angle $\theta$ of incidence on the basis only of the phases of the two output signals of the 3dB-90° type hybrid junction.--

Signed and Sealed this

Twenty-ninth Day of March, 1994

Attest:

BRUCE LEHMAN

*Attesting Officer*     *Commissioner of Patents and Trademarks*